UNITED STATES PATENT OFFICE.

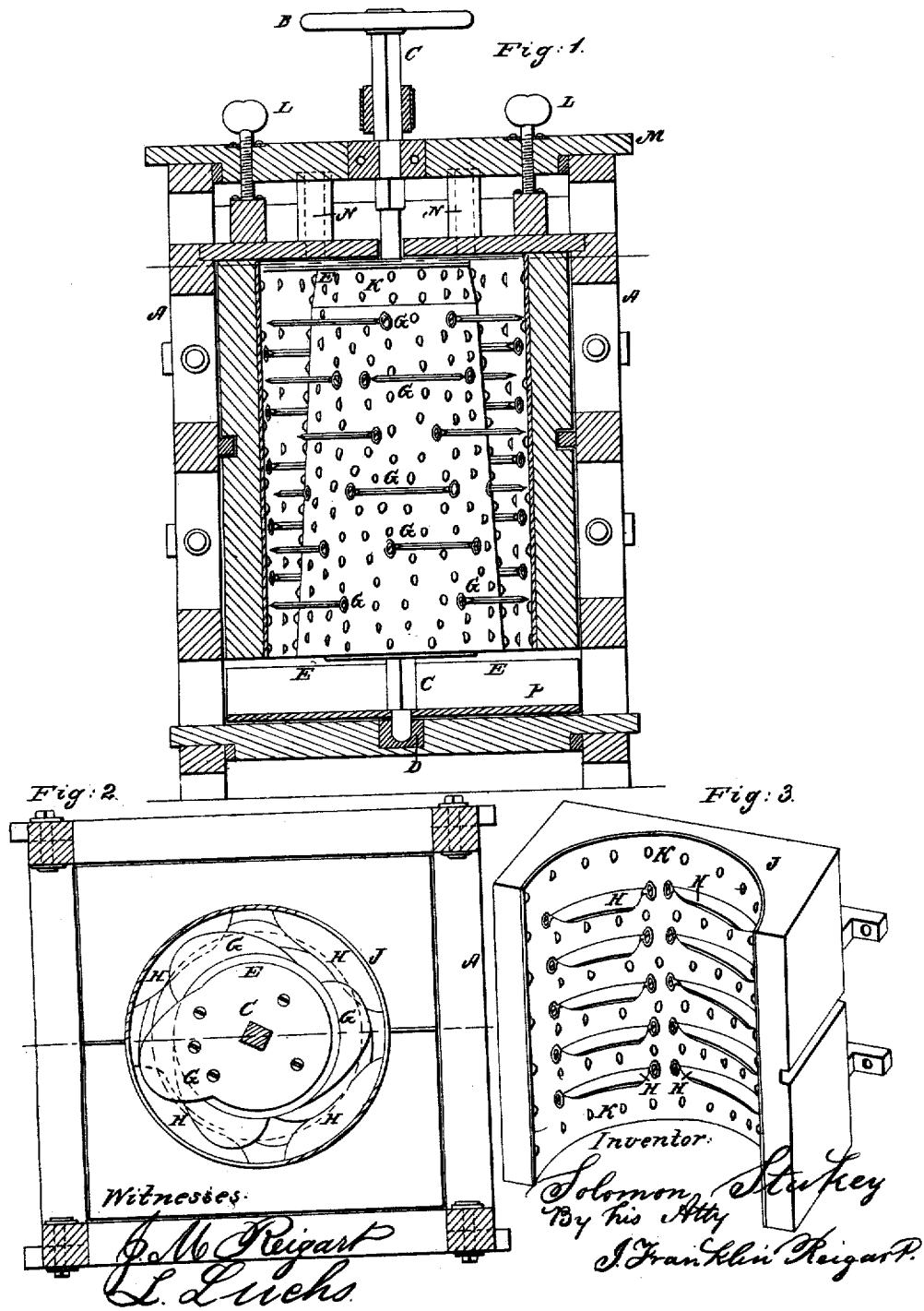

SOLOMON STUKEY, OF SUGAR GROVE, OHIO.

MACHINE FOR GRINDING COB AND CORN.

Specification forming part of Letters Patent No. 58,912, dated October 16, 1866.

*To all whom it may concern:*

Be it known that I, SOLOMON STUKEY, of Sugar Grove, Fairfield county, State of Ohio, have invented new and useful Improvements in Machines for Grinding Cob and Corn; and I do hereby declare the following to be an exact description thereof, reference being had to the accompanying drawings, and to the letters of reference marked thereon, making a part of this specification, in which—

Figure 1 is a vertical section of the machine; Fig. 2, a top view; and Fig. 3 represents the movable concave.

A represents the square box or frame in which the grinding devices operate. B is a fly-wheel at the top of the spindle or upright shaft C. D is the step. E represents the conical cylinder that contains curved projecting knives G, set spirally on the outside of the cone, that operate between projecting knives H, attached to the concave J. On the outside of the cone or cylinder E are round raised projections K, and similar projections K on the concave J, so as to produce a grinding-surface.

The cylinder and concave may be made of iron or wood.

L are regulating-screws for raising or lowering the cylinder by means of the cross-beam M, in which the spindle C operates, that closes or widens the spaces between the knives G of the cylinder and the knives H of the concave. N N are spouts at top, through which the ears of corn are passed to feed the machine, the ears falling in upon and between the knives G and H, that cut the ears finely, while the projections K grind them; and the ground cob and corn, falling upon an inclined board, P, below, is discharged into a separate receptacle.

The concave J is firmly fastened to a square frame and in two parts, so as to be quickly and easily taken apart for transportation, making a neat portable machine.

What I claim as my invention, and desire to secure by Letters Patent, is—

The construction of the conical cylinder and concave with their curved knives G and H and projections K, so arranged as to cut and grind the cob and corn, as herein described.

SOLOMON STUKEY.

Witnesses:
GEORGE F. HUMMEL,
JACOB PHILLIP.